United States Patent [19]

Miyoshi et al.

[11] Patent Number: 5,153,724
[45] Date of Patent: Oct. 6, 1992

[54] VIDEO SIGNAL SWITCHING CIRCUIT ESPECIALLY SUITABLE FOR HIGH DEFINITION TELEVISION RECEIVING

[75] Inventors: Toshihiro Miyoshi; Hideyuki Ikuhara, both of Osaka; Yuichi Ninomiya, Kanagawa; Toshiro Ohmura, Tokyo, all of Japan

[73] Assignees: Matsushita Electric Industrial Co., Ltd.; Nippon Hoso Kyokai, both of Japan

[21] Appl. No.: 499,351

[22] PCT Filed: Oct. 24, 1989

[86] PCT No.: PCT/JP88/01085

§ 371 Date: Aug. 6, 1990

§ 102(e) Date: Aug. 6, 1990

[87] PCT Pub. No.: WO90/04904

PCT Pub. Date: Mar. 5, 1990

[30] Foreign Application Priority Data

Oct. 24, 1988 [JP] Japan .................. 63-267450

[51] Int. Cl.$^5$ .................................................. A04N 3/24
[52] U.S. Cl. .................................. 358/148; 358/181; 358/165
[58] Field of Search ............... 358/165, 181, 188, 148

[56] References Cited

U.S. PATENT DOCUMENTS

| | | | |
|---|---|---|---|
| 3,812,289 | 5/1974 | Avins | 358/165 |
| 4,306,250 | 12/1981 | Summers et al. | 358/148 |
| 4,329,675 | 5/1982 | Van Hulle | 358/181 |
| 4,992,872 | 2/1991 | Hartmann et al. | 358/165 |
| 5,018,015 | 5/1991 | Sunada et al. | 358/18 P |

FOREIGN PATENT DOCUMENTS

| | | | |
|---|---|---|---|
| 59-77779 | 5/1984 | Japan | |
| 0235592 | 11/1985 | Japan | 358/165 |
| 61-176878 | 11/1986 | Japan | |
| 62-7278 | 1/1987 | Japan | |
| 0010980 | 1/1987 | Japan | 358/165 |
| 62-12282 | 1/1987 | Japan | |
| 63-199587 | 8/1988 | Japan | |
| 08802974 | 4/1988 | PCT Int'l Appl. | |

OTHER PUBLICATIONS

Yuichi Ninomiya et al, "HD-TV Broadcasting System Using Single Channel Satellite (MUSE)," *NHK Science and Technical Research Laboratories*, IE84-72, Dec. 20, 1984, pp. 1-8.

*Primary Examiner*—James J. Groody
*Assistant Examiner*—Jeffrey S. Murrell
*Attorney, Agent, or Firm*—Mason, Fenwick & Lawrence

[57] ABSTRACT

The present invention provides an apparatus which receives and displays a high definition television signal and which is constructed so that noise and/or a deformed picture may not be displayed even when an input signal instead of a high definition television signal is applied or when transmission of such a high definition television signal is interrupted. In the apparatus, on the basis of whether or not a frame signal in an input high definition television signal can be detected, a first signal indicating synchronization lock or a second signal indicating synchronization unlock is generated so that, when the first signal is detected, the output of a signal processing circuit (110) is selected to display the high definition television signal, while when the second signal is detected, the output of a pattern generation circuit (114) is selected to prevent display of noise etc.

1 Claim, 4 Drawing Sheets

VIDEO SIGNAL SWITCHING CIRCUIT ESPECIALLY SUITABLE FOR HIGH DEFINITION TELEVISION RECEIVING

TECHNICAL FIELD

This invention relates to a high definition television (hi-vision) receiving apparatus.

BACKGROUND ART

A high definition television (hi-vision) displays a highly finely defined television picture on a wide screen having a large display area so as to provide novel attractive features, such as a strong appeal and a feeling of real presence on the site, which cannot be exhibited by the current conventional television broadcasting and is now favored with a growing interest in various countries.

As one of methods for attaining bandwidth compression of this high definition television signal, a method called MUSE (Multiple such-Nyquist Sampling Encoding) has been proposed by the Japan Broadcasting Corporation (NHK). The details of this MUSE are described in (Yuichi Ninomiya et al, "Satellite Broadcasting Channel No. 1 Transmission System (MUSE) for High Definition Television", The Institute of Electronics and Communication Engineers of Japan, Technical Report, IE84-72, 1984).

The outline of this transmission system is shown in FIG. 3. At a transmitting side, a picture signal obtained by a high definition camera or a VTR 31 is converted by an A/D conversion circuit 32 into a digital signal which is, after being subjected to sub-sampling in a sub-sampling circuit 33 and passed through a transmission matching filter 34, converted into an analog signal by a D/A conversion circuit 35, and the analog signal is transmitted after FM modulation by an FM modulator 36. At a receiving side receiving this signal, the signal is demodulated by an FM demodulator 37 and converted by an A/D conversion circuit 38 into a digital signal which is, after being subjected to sub-sampling in a sub-sampling circuit 39 and then processed by a two-dimensional interpolation circuit 310, converted into an an analog signal by a D/A conversion circuit 311, and this analog signal is displayed on a high definition display 312.

In the system, a horizontal synchronizing signal as shown in FIG. 4 is added to all the lines (1125 lines), and a vertical synchronizing signal as shown in FIG. 5 is added, as synchronizing signals.

FIG. 2 shows the basic structure of a prior art synchronizing signal processing circuit incorporated in a receiver. A signal applied to an input terminal 21 is demodulated by an FM demodulator 22 and, after the bandwidth is limited by a low-pass filter 23, the signal is converted into a digital signal by an A/D conversion circuit 24. A phase detection circuit 25 generates the result of computation of (the level at a point b+the level at a point c)−2 x (the level at a point a) in the horizontal synchronizing signal shown in FIG. 4, as an output representing the phase error of the synchronizing signal. Then, this signal is integrated by an integration circuit 26 so as to absorb any sharp change. A voltage-controlled oscillator (VCO) 27 generates a sampling clock applied to the A/D conversion circuit 24, and the output of the integration circuit 26 controls the phase of the sampling clock.

The vertical synchronizing signal (the frame pattern) shown in FIG. 5 is inserted in a picture signal corresponding to one horizontal period in one frame, and in the vertical synchronizing signal, 17.5 pairs of rectangular frame pulses having a pulse width of 4 ck at 16 MHz are repeated at a 100% level, where "ck" is a signal of higher frequency. A frame pulse detection circuit 28 detects the vertical synchronizing signal so as to provide a reference pulse for a timing generation circuit 29. On the basis of this frame pulse, the timing generation circuit 29 generates various timing pulses for a signal processing circuit 210. The signal processing circuit 210 carries out conversion inverse to the bandwidth compression etc. made at the transmitting side and, on the basis of the luminance signal and color difference signals, converts the signal into the red (R), green (G) and blue (B) signals, and a D/a conversion circuit 211 converts these signals into an analog signal (R, G, B) so as to display the picture on a high definition display 212.

However, with such a prior art structure, noise and/or a deformed picture may be displayed on the high definition display when the input picture signal is not a high definition television signal (a MUSE signal) or when transmission of a high definition television signal (a MUSE signal) is interrupted.

DISCLOSURE OF INVENTION

It is an object of the present invention to prevent display of noise and/or a deformed picture on a high definition display even when an input picture signal is not a high definition television signal or when transmission of such a high definition television signal is interrupted.

The television receiving apparatus of the present invention which attains the above object comprises a frame pulse detection circuit deciding whether or not a frame pulse can be detected, an output signal switching circuit switching its output signal in response to a synchronization locking signal generated from the frame pulse detection circuit, and a pattern generation circuit, so that the output signal is automatically switched depending on whether or not the synchronization is locked.

BEST MODE FOR CARRYING OUT THE INVENTION

An embodiment of the high definition television receiving apparatus of the present invention will now be described with reference to the drawings.

Figure 1:
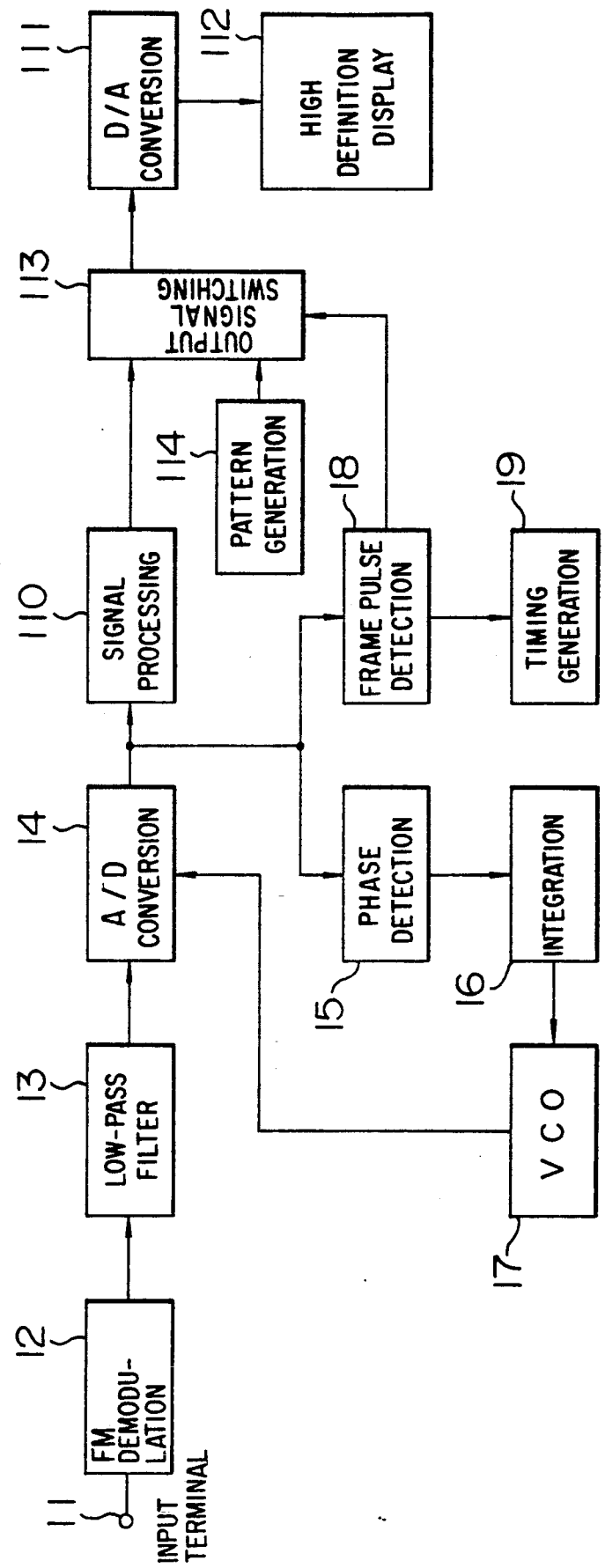
FIG. 1 is a block diagram of an embodiment of the high definition television receiving apparatus according to the present invention.
Figure 2:
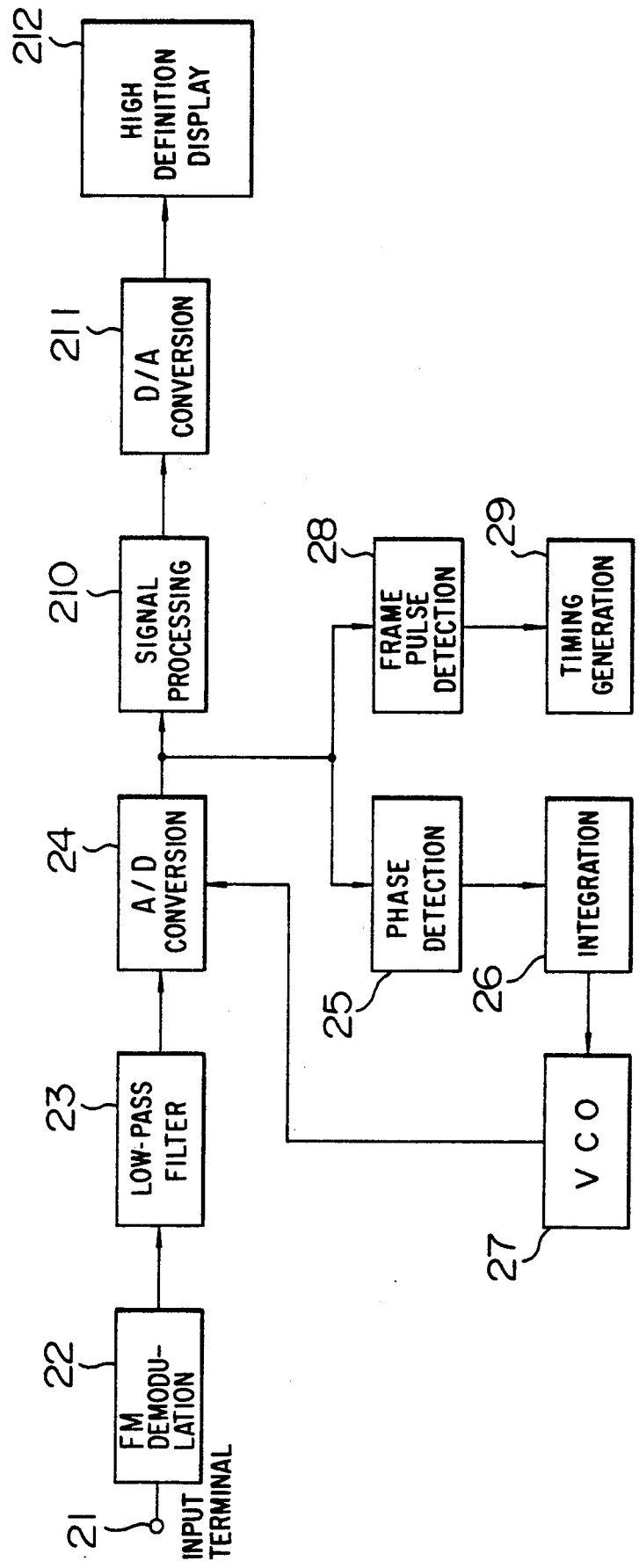
FIG. 2 is a block diagram of a prior art.
Figure 3:
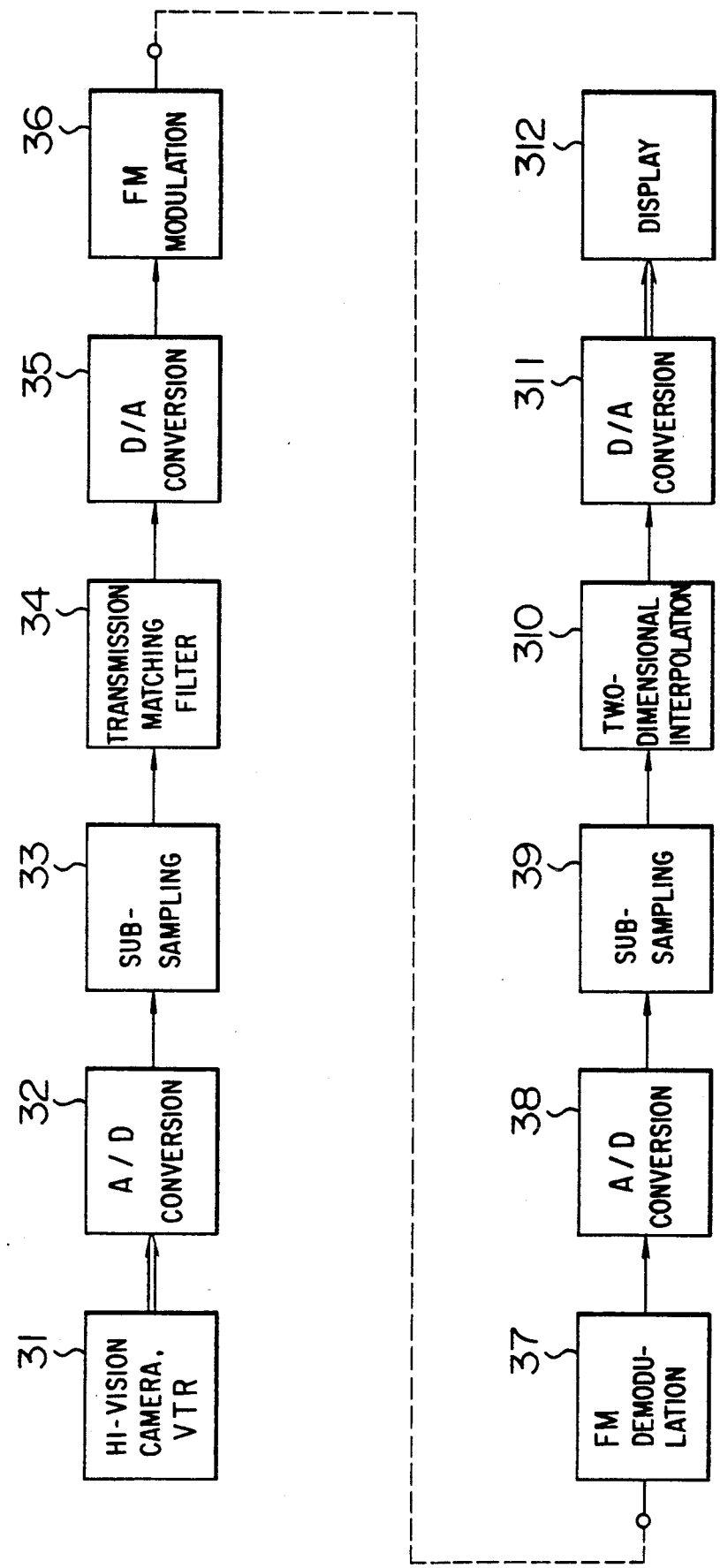
FIG. 3 is a block diagram of an apparatus for realizing high definition television transmission.
Figure 4:
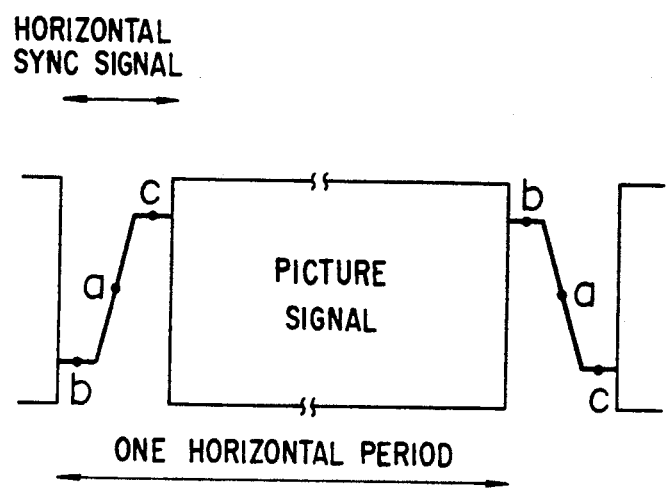
FIG. 4 is a waveform diagram of a horizontal synchronizing signal.
Figure 5:
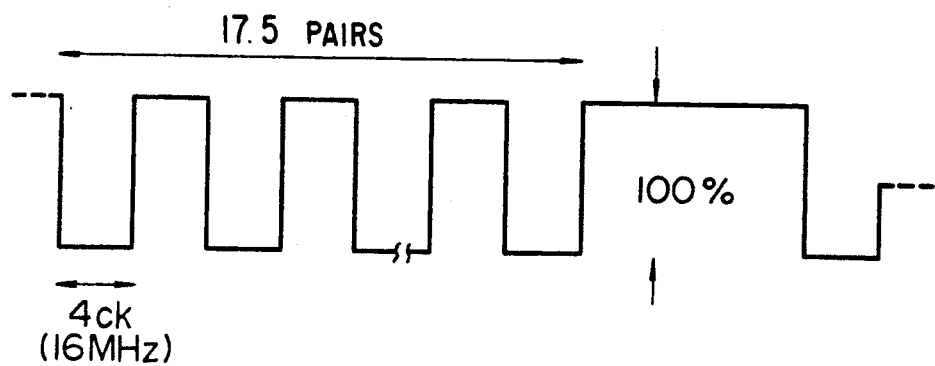
FIG. 5 is a waveform diagram of a vertical synchronizing (frame pulse) signal.

FIG. 1 shows the structure of the high definition television receiving apparatus embodying the present invention.

11 is an input terminal, 12 is an FM demodulator, 13 is a low-pass filter, 14 is an A/D conversion circuit, 15 is a phase detection circuit, 16 is an integrator, 17 is a VCO, 18 is a frame pulse detection circuit, 19 is a timing generation circuit, 110 is a signal processing circuit, 111 is a D/A conversion circuit, and 112 is a high definition display. The illustrated structure is similar to the prior art structure, except for the provision of an output signal switching circuit 113 and a pattern generation circuit 114.

The operation of the high definition television receiving apparatus having the illustrated structure will now be described with reference to FIG. 1.

An high definition television (MUSE) signal applied to the input terminal 11 is FM-demodulated by the FM demodulator 12 and, after bandwidth limitation by the low-pass filter 13, the analog signal is converted by the A/D conversion circuit 14 into a digital signal. Then, after detection of deviation of the sampling phase by the phase detection circuit 15, the digital signal is integrated by the integrator 16 which absorbs any sharp change. This integrated voltage is used to control the VCO 17 which controls the sampling phase. The frame pulse detection circuit 18 detects the frame pulse and generates a synchronization lock/unlock signal.

Further, on the basis of the frame pulse signal generated from the frame pulse detection circuit 18, the timing generation circuit 19 generates various timing signals for the signal processing circuit 110.

Also, on the signal generated from eh A/D conversion circuit 14, the signal processing circuit 110 carries out conversion inverse to the bandwidth compression etc. made at the transmitting side, and its output signal is applied to the output signal switching circuit 113. The output signal of the pattern generation circuit 114 including, for example, a ROM is also applied to the output signal switching circuit 113.

These input signals applied to the output signal switching circuit 113 are switched on the basis of the synchronization lock/unlock signal generated from the frame pulse detection circuit 18. That is, when the synchronization lock/unlock signal indicates the synchronization lock, the output signal of the signal processing circuit 110 is applied to the D/A conversion circuit 111, while when the synchronization lock/unlock signal indicates the synchronization unlock, the output of the pattern generation circuit 114 is applied to the D/A conversion circuit 111, and the D/A conversion circuit 111 converts the digital picture signals of red (R), green (G) and blue (B) into an analog signal so as to display the picture on the high definition display 112.

Thus, according to the present invention in which the frame pulse detection circuit 18, the pattern generation circuit 114 and the output signal switching circuit 113 are provided, a picture of a desired pattern can be displayed without displaying noise and/or a deformed picture even when an input signal is not a high definition television signal or when transmission of such a high definition television signal is interrupted.

INDUSTRIAL APPLICABILITY

It will be understood from the foregoing description that, according to the present invention in which a frame pulse detection circuit, a pattern generation circuit and an output signal switching circuit are provided, a picture of a desired pattern can be displayed without displaying noise and/or a deformed picture even when an input signal instead of a high definition television signal is applied or when transmission of such a high definition television signal is interrupted.

We claim:
1. A television receiving apparatus comprising:
   a low-pass filter limiting the bandwidth of a high definition television signal;
   an A/D conversion circuit converting the bandwidth-limited signal into a digital signal;
   a frame pulse detection circuit detecting a frame signal in the digital signal and providing a synchronization detection signal;
   a signal processing circuit processing said digital signal;
   a pattern generation circuit generating a pattern signal; and
   an output signal switching circuit, switching between the output signal of the signal processing circuit and the output signal of the pattern generation circuit, so as to generate an output signal;
   wherein eh frame pulse detection circuit detects a lock or unlock of synchronization o the high definition television signal and applies tits synchronization detection signal to the output signal switching circuit, so that the output signal switching circuit provides (a) the output signal of the signal processing circuit or (b) the output signal of said pattern generation circuit, when the synchronization lock and synchronization unlock are detected, respectively.

* * * * *